(12) United States Patent
Silverstein et al.

(10) Patent No.: US 11,501,426 B2
(45) Date of Patent: Nov. 15, 2022

(54) TRACKING OF MASS-PRODUCED PRODUCTS

(71) Applicant: International Business Machines Corporation, Armonk, NY (US)

(72) Inventors: Zachary A. Silverstein, Jacksonville, FL (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 17/023,845

(22) Filed: Sep. 17, 2020

(65) Prior Publication Data
US 2022/0084175 A1    Mar. 17, 2022

(51) Int. Cl.
*G06T 7/00* (2017.01)
*G06Q 30/00* (2012.01)
*G06Q 30/06* (2012.01)
*G07C 3/14* (2006.01)

(52) U.S. Cl.
CPC .......... *G06T 7/001* (2013.01); *G06Q 30/018* (2013.01); *G06Q 30/0627* (2013.01); *G07C 3/14* (2013.01)

(58) Field of Classification Search
CPC ... G06Q 30/018; G06Q 30/0627; G06T 7/001
See application file for complete search history.

(56) References Cited

U.S. PATENT DOCUMENTS

2003/0063792 A1* 4/2003 Hiroi .................. G06T 7/001
                                                  382/149
2004/0052410 A1* 3/2004 Yasukawa .......... H04N 1/00079
                                                  382/141
2008/0310702 A1* 12/2008 Taguchi ................. G06T 7/001
                                                  382/141
2018/0268099 A1* 9/2018 Katzir ..................... G06T 7/337
2019/0138970 A1  5/2019 Deutsch
2019/0354922 A1  11/2019 Berti
(Continued)

FOREIGN PATENT DOCUMENTS

WO     2019216941 A1    11/2019

OTHER PUBLICATIONS

Anonymous et al., "Digital Twin Market Size Worth $26.07 Billion By 2025 | CAGR 38.2%", Grand View Research, Dec. 2018, 3 Pages.
(Continued)

*Primary Examiner* — Pinalben Patel
(74) *Attorney, Agent, or Firm* — Stephanie L. Carusillo

(57) ABSTRACT

In an approach to tracking mass-produced items via a digital twin, one or more computer processors receive one or more images of a product. One or more computer processors retrieve a digital twin template corresponding to the product. One or more computer processors detect an imperfection in the one or more images of the product. One or more computer processors map data associated with the imperfection to the digital twin template. One or more computer processors map data associated with the imperfection to the digital twin template. One or more computer processors assign a unique identifier to the digital twin template that includes the data associated with the imperfection. One or more computer processors store the data associated with the imperfection in association with the unique identifier.

20 Claims, 3 Drawing Sheets

(56) References Cited

U.S. PATENT DOCUMENTS

2020/0034498 A1   1/2020   Avdovic

OTHER PUBLICATIONS

Wikipedia, "Digital twin", Wikipedia, Jun. 30, 2020, 17 Pages.
Anonymous et al., "Digital twin: Helping machines tell their story", IBM, Accessed on Aug. 13, 2020, 11 Pages.
Qi et al., "Digital Twin and Big Data Towards Smart Manufacturing and Industry 4.0: 360 Degree Comparison", IEEE Access, DOI: 10.1109/ACCESS.2018.2793265, Jan. 2018, 11 Pages.
Xu et al., "A Digital-Twin-Assisted Fault Diagnosis Using Deep Transfer Learning", IEEE Access, Special Section on Advances in Prognostics and System Health Management, vol. 7, Jan. 1, 2019, 10 Pages.

* cited by examiner

TRACKING OF MASS-PRODUCED PRODUCTS

BACKGROUND OF THE INVENTION

The present invention relates generally to the field of manufacturing traceability, and more particularly to tracking mass-produced items via a digital twin.

A digital twin refers to a digital representation of a physical asset. In Internet of Things (IoT) systems, a digital twin can represent an evolving virtual data model that mimics the physical asset as well as the experiences and state changes of the physical asset. A digital twin may be said to store and track information about its twin physical asset. A digital twin marketplace allows manufacturers and suppliers to share digital resources associated with physical assets with owners and operators of the manufacturers' physical assets. Examples of digital resources include, but are not limited to, a bill of materials, warranty bulletins, warranty claims, maintenance plans, maintenance history, part replacement history, part usage history, specifications, 3-dimensional (3D) model and drawing data, operating manuals, usage data, operating history, ownership history, applicable standards, etc.

Product traceability is the ability to identify, track, and trace elements of a product as it moves along the supply chain from raw goods to finished products. It provides numerous benefits such as the ability to investigate and troubleshoot issues related to a component or ingredient. Traceability has three key benefits: it increases supply chain visibility, improves quality control systems, and reduces risk. By keeping a record of the entire production and distribution history, suppliers are able to react quickly to any issues.

SUMMARY

Embodiments of the present invention disclose a computer-implemented method, a computer program product, and a system for tracking mass-produced items via a digital twin. The computer-implemented method may include one or more computer processors receiving one or more images of a product. One or more computer processors retrieve a digital twin template corresponding to the product. One or more computer processors detect an imperfection in the one or more images of the product. One or more computer processors map data associated with the imperfection to the digital twin template. One or more computer processors map data associated with the imperfection to the digital twin template. One or more computer processors assign a unique identifier to the digital twin template that includes the data associated with the imperfection. One or more computer processors store the data associated with the imperfection in association with the unique identifier.

DETAILED DESCRIPTION

Items or products manufactured in large quantities may have a variety of imperfections or anomalies, for example, pieces of metal may be marred in a specific way, items can be discolored, items may have chips and/or scratches, etc. When items are produced in such a way, tracking an individual piece without some form of unique identifier may be difficult, for example, utilizing microstamping may be cost prohibitive and require special equipment. Within the digital twin space, tracking an Internet of Things (IoT) enabled item is possible, but tracking items with no connectivity to the IoT is challenging. Embodiments of the present invention recognize that manufacturing traceability may be improved by utilizing a unique copy of a digital twin template for each mass-produced item, utilizing the relationship with the object to identify and subsequently mark the object with a unique identifier. Embodiments of the present invention also recognize that efficiency of quality control may be gained by capturing the physical attributes of an item with a camera and searching a data store for any matching imperfections or damage. Implementation of embodiments of the invention may take a variety of forms, and exemplary implementation details are discussed subsequently with reference to the Figures.

Figure 1:
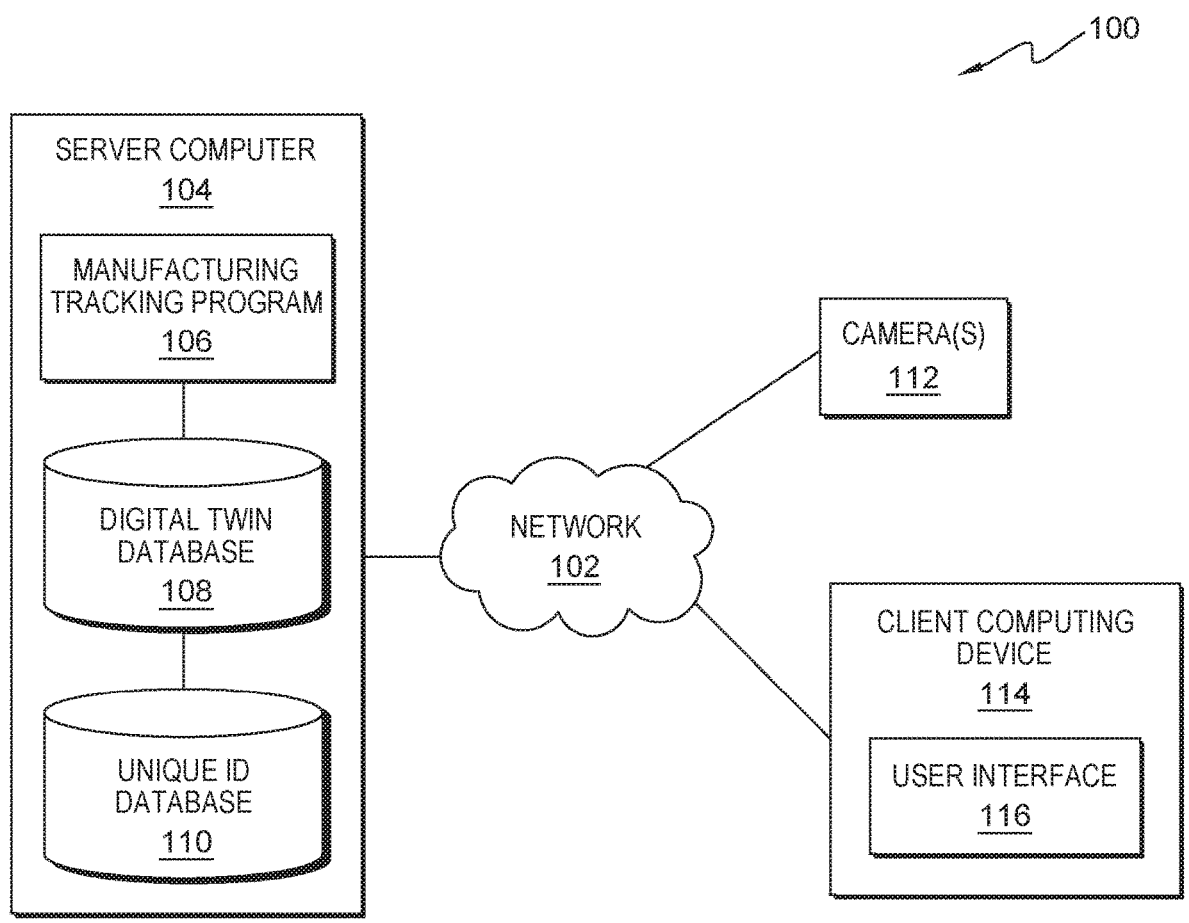
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, camera(s) 112, and client computing device 114, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, camera(s) 112, client computing device 114, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with camera(s) 112, client computing device 114, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes manufacturing tracking program 106, digital twin database 108, and unique identifier (unique ID) database 110. Server computer 104 may include internal and external hardware components, as depicted and described in further detail with respect to FIG. 3.

Manufacturing tracking program 106 leverages a camera to capture any imperfections of a product, maps the imperfections against a copy of a digital twin template of the product, and creates a relevant unique identifier (unique ID) through the imperfection mapping to that specific product. Manufacturing tracking program 106 receives an image of a product. Manufacturing tracking program 106 retrieves a digital twin template of the product. Manufacturing tracking program 106 detects an imperfection of the product in the image and maps the imperfection data to the digital twin template, creating a unique digital twin. Manufacturing tracking program 106 assigns a unique ID to the unique digital twin. Manufacturing tracking program 106 retrieves metadata associated with the product and stores the imperfection data and the metadata in association with the unique ID. After repeating this process for a plurality of products, manufacturing tracking program 106 determines quality trends from the stored data. Manufacturing tracking program 106 generates a report that includes the quality trends and transmits the report to a user. Manufacturing tracking program 106 is depicted and described in further detail with respect to FIG. 2.

Digital twin database 108 and unique ID database 110 are each a repository for data used by manufacturing tracking program 106. In the depicted embodiment, digital twin database 108 and unique ID database 110 reside on server computer 104. In another embodiment, digital twin database 108 and unique ID database 110 may each reside elsewhere within distributed data processing environment 100, provided manufacturing tracking program 106 has access to digital twin database 108 and unique ID database 110. In the depicted embodiment, digital twin database 108 and unique ID database 110 are separate entities. In another embodiment, digital twin database 108 and unique ID database 110 may be included in a combined database. A database is an organized collection of data. Digital twin database 108 and unique ID database 110 can be implemented with any type of storage device capable of storing data and configuration files that can be accessed and utilized by manufacturing tracking program 106, such as a database server, a hard disk drive, or a flash memory. Digital twin database 108 stores templates of digital twins for products manufactured by a manufacturing entity. Each template includes digital content associated with a physical asset, including, but not limited to, a bill of materials, an operating manual, a 3D drawing, processing details, specifications, etc. Each template represents what a "perfect" product might resemble with respect to the scope of the product to be created within a lab, factory, manufacturing site, etc., and the overall definition of the product and its properties, including, for example, weight, shape, planes, curvature, etc. Digital twin database 108 may also store additional specifications and criteria specific to a product. Unique ID database 110 stores data produced and/or detected during the manufacturing process of a product, including, but not limited to, images of the product: detected defects, imperfections, or anomalies; and manufacturing process details, such as lot number, lot quantity, timestamp of various processes, traceability data associated with the materials used, etc. Unique ID database 110 stores the data in association with a unique ID of each part manufactured. The identifier may be, for example, an alphanumeric ID which accounts for the chronology of the manufacturing process.

The present invention may contain various accessible data sources, such as digital twin database 108 and unique ID database 110, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Manufacturing tracking program 106 enables the authorized and secure processing of personal data. Manufacturing tracking program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Manufacturing tracking program 106 provides information regarding personal data and the nature (e.g., type, scope, purpose, duration, etc.) of the processing. Manufacturing tracking program 106 provides the user with copies of stored personal data. Manufacturing tracking program 106 allows the correction or completion of incorrect or incomplete personal data. Manufacturing tracking program 106 allows the immediate deletion of personal data.

Camera(s) 112 capture images of one or more products during a manufacturing process for the purpose of documenting any defects, imperfections, artifacts, damage, or anomalies of the products. Camera(s) 112 may be one or more of a plurality of types of camera, including, but not limited to, high definition, pin-hole, stereo, omni-directional, non-central, infrared, video, digital, three dimensional, panoramic, filter-based, wide-field, narrow-field, telescopic, microscopic, etc. In some embodiments, camera(s) 112 include any device capable of imaging a portion of the electromagnetic spectrum. In one embodiment, one or more of camera(s) 112 are a component of an unmanned aerial vehicle (UAV) or autonomous robot used to gather product data. In another embodiment, camera(s) 112 may be integrated into a smart phone or other device used by an employee to gather product data. In some embodiments, camera(s) 112 include a plurality of image capturing devices that are positioned around a manufacturing line and/or an inspection area.

Client computing device 114 can be one or more of a laptop computer, a tablet computer, a smart phone, a smart watch, a smart speaker, or any programmable electronic device capable of communicating with various components and devices within distributed data processing environment 100, via network 102. Client computing device 114 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 114 may be integrated into a vehicle of the user. For example, client computing device 114 may include a heads-up display in the windshield of the vehicle. In general, client computing device 114 represents one or more programmable electronic devices or combination of programmable electronic devices capable of executing machine readable program instructions and communicating with other computing devices (not shown) within distributed data processing environment 100 via a network, such as network 102. Client computing device 114 includes an instance of user interface 116.

User interface 116 provides an interface between manufacturing tracking program 106 on server computer 104 and a user of client computing device 114. In one embodiment, user interface 116 is mobile application software. Mobile application software, or an "app," is a computer program designed to run on smart phones, tablet computers and other mobile devices. In one embodiment, user interface 116 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 116 enables a user of client computing device 114 to receive data and reports generated by manufacturing tracking program 106. User interface 116 may also enable a user of client computing device 114 to operate camera(s) 112 to capture images.

Figure 2:
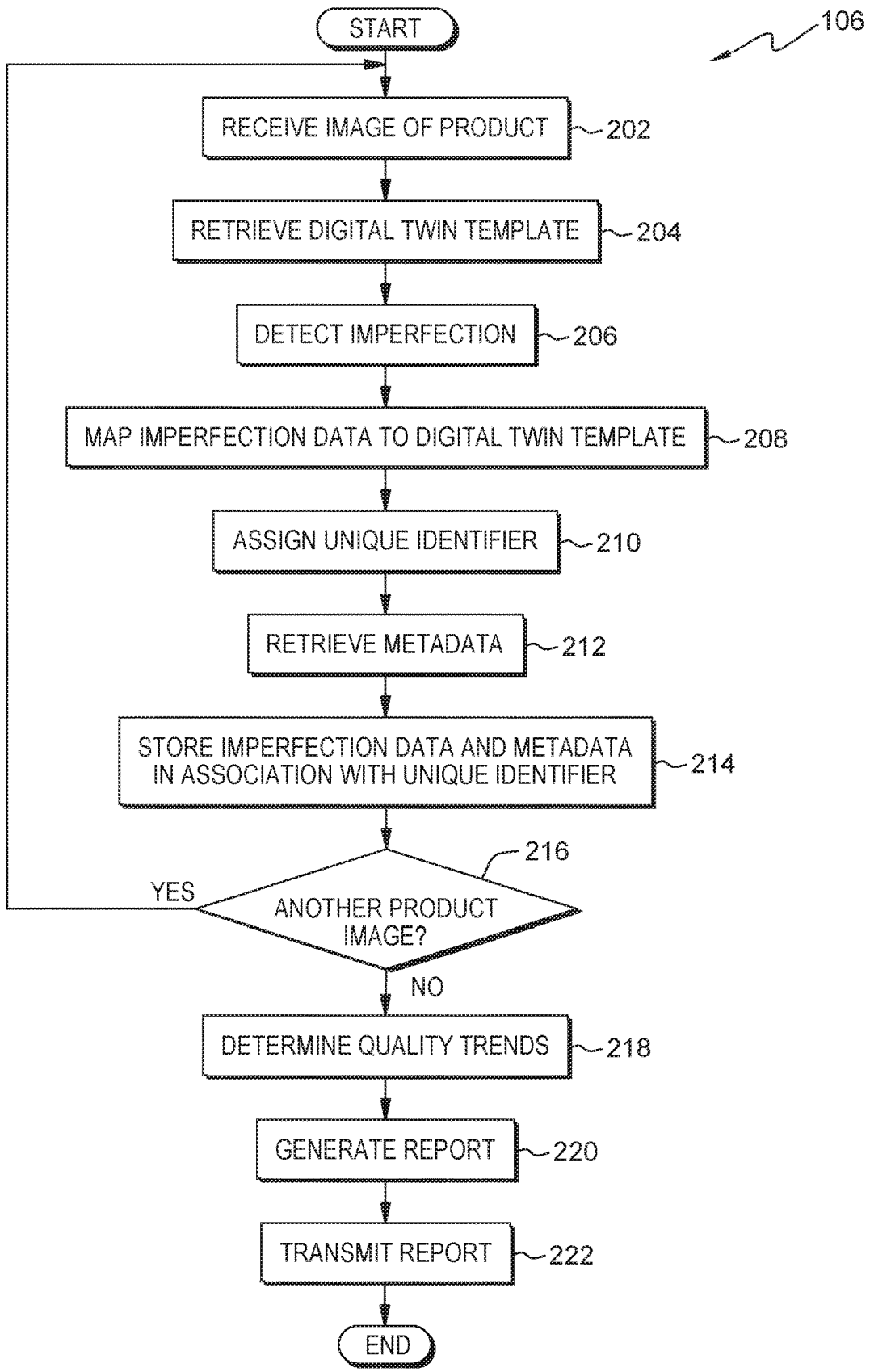
FIG. 2 is a flowchart depicting operational steps of a manufacturing tracking program, on a server computer within the distributed data processing environment of FIG. 1, for tracking mass-produced items via a digital twin, in accordance with an embodiment of the present invention.

FIG. 2 is a flowchart depicting operational steps of manufacturing tracking program 106, on server computer 104 within distributed data processing environment 100 of FIG. 1, for tracking mass produced items via a digital twin, in accordance with an embodiment of the present invention.

Manufacturing tracking program 106 receives an image of a product (step 202). In an embodiment, camera(s) 112 are high definition cameras and are set up to capture one or more images of a product at one or more various stages of the manufacturing process. In an embodiment, camera(s) 112 capture images of the product taken from multiple angles. When camera(s) 112 capture an image of the product, manufacturing tracking program 106 receives the image. In one embodiment, manufacturing tracking program 106 receives the image directly from camera(s) 112. In another embodiment, manufacturing tracking program 106 receives the image from a user of client computing device 114.

Manufacturing tracking program 106 retrieves a digital twin template (step 204). In an embodiment, manufacturing tracking program 106 retrieves a digital twin template corresponding to the product from digital twin database 108. In an embodiment, manufacturing tracking program 106 also retrieves one or more specifications, drawings, and/or other criteria to which the product must adhere.

Manufacturing tracking program 106 detects an imperfection in the product (step 206). In an embodiment, manufacturing tracking program 106 compares the received image to the requirements of the digital twin, and corresponding criteria, and detects a difference between the digital twin and the actual product. The difference may be characterized as an imperfection, a defect, an anomaly, or a characteristic. In one embodiment, manufacturing tracking program 106 may make one or more measurements of the image of the product in order to detect an imperfection. In one embodiment, manufacturing tracking program 106 may not detect an imperfection, but may take measurements of one or more characteristics of the product to determine values within a specified range.

Manufacturing tracking program 106 maps the imperfection data to the digital twin template (step 208). In an embodiment, manufacturing tracking program 106 maps the imperfection data to the digital twin template via coordinates that describe the location of the one or more imperfections on the product. For example, manufacturing tracking program 106 may map the imperfection data to a specific quadrant of the product. In another example, manufacturing tracking program 106 may map the imperfection based on utilizing 3D object surface marking. In a further example, manufacturing tracking program 106 may utilize matrix marking identification with the location mapping from the digital twin template to the location of the imperfection on the physical object. In one embodiment, once manufacturing tracking program 106 maps the imperfection data to the digital twin template, manufacturing tracking program 106 saves the new version of the digital twin separately from the template as a unique digital twin that represents a specific product that exhibits the one or more imperfections. In an embodiment where manufacturing tracking program 106 detects specific characteristics, manufacturing tracking program 106 can use the explicit values to identify the product. In the embodiment, manufacturing tracking program 106 may store the saved unique digital twin in unique ID database 110.

Manufacturing tracking program 106 assigns a unique ID (step 210). In an embodiment, manufacturing tracking program 106 assigns a unique ID to the unique digital twin such that the data associated with the unique digital twin can be recalled for data collection. Thus, each uniquely identified digital twin represents a product with specific imperfections, anomalies, and/or characteristics embedded in the unique ID, which can be used as a means of identifying a mass-produced item. In one embodiment, the unique ID may be, for example, an alpha-numeric ID that accounts for the chronology of the manufacturing process.

Manufacturing tracking program 106 retrieves metadata (step 212). In an embodiment, manufacturing tracking program 106 retrieves metadata associated with the manufacturing process of the product associated with the unique ID to further identify the product and improve the traceability of the product. Metadata can include contextual data such as the location, date, and time of manufacture of the product. Metadata can also include contextual data associated with raw materials used to manufacture the product, such as lot number, date received in the factory, associated certificates of compliance, receiving inspection data, etc. For example, the metadata may include the temperature at which raw materials were forged. Metadata may also include other manufacturing process data, including, but not limited to, a lot size, an identification of an operator that processed the lot, a routing of a manufacturing process, a timestamp of each of the various processes, traceability data associated with the materials used, etc.

Manufacturing tracking program 106 stores the imperfection data and metadata in association with the unique ID (step 214). In an embodiment, to enable full traceability of each unique product or item, manufacturing tracking program 106 stores the imperfection data and the retrieved metadata associated with each unique product in association with the assigned unique ID in unique ID database 110.

Manufacturing tracking program 106 determines whether there is another product image (decision block 216). In an embodiment, manufacturing tracking program 106 iteratively receives images associated with products from a manufacturing run until images of all the products in the run have been received. If manufacturing tracking program 106 determines there is another product image ("yes" branch, decision block 216), then manufacturing tracking program 106 returns to step 202 to receive the image.

If manufacturing tracking program 106 determines there is not another product image ("no" branch, decision block 216), then manufacturing tracking program 106 determines quality trends (step 218). In an embodiment, manufacturing tracking program 106 aggregates and analyzes the data associated with each unique ID in order to determine whether there are any trends in the data. For example, manufacturing tracking program 106 may analyze the location of imperfections in each unique ID to determine that a manufacturing artifact is present on a portion of the products produced in the same manufacturing lot or time frame. In another example, manufacturing tracking program 106 may determine whether the quantity of products with a particular imperfection is trending up or down over time. In a further example, manufacturing tracking program 106 may determine which of the products do not meet a specification or criteria and specify the unique ID of those products that have to be sorted out of a lot. Manufacturing tracking program 106 can sort the products by matching the products to the associated unique ID. In an embodiment, manufacturing tracking program 106 may not look for a perfect match, but rather the most similar match or the highest quantity of imperfections that line up with the digital copy. In another embodiment, manufacturing tracking program 106 can determine how a product with a particular anomaly may perform in the future by using the digital twin to apply the defect and perform virtual testing. In an embodiment, if a product fails at some time in the future, a user can match the product to its unique ID and use the associated quality data as part of a failure analysis process.

Manufacturing tracking program 106 generates a report (step 220). In an embodiment, based on the analysis of the data associated with each unique ID and any observed trends, manufacturing tracking program 106 generates a report. For example, the report may include a list of each unique ID and any associated imperfections, defects, anomalies, and/or characteristics. In another example, manufacturing tracking program 106 may generate one or more graphs to describe one or more quality trends. In a further example, the report may include a list of unique IDs that do not meet specified criteria for a product.

Manufacturing tracking program 106 transmits the report (step 222). In an embodiment, manufacturing tracking program 106 transmits the report to a user of client computing device 114 via user interface 116. For example, manufacturing tracking program 106 may send an email to the user of client computing device 114 that includes the report. In another example, manufacturing tracking program 106 may display the report on a screen associated with client computing device 114. In a further example, manufacturing tracking program 106 may send a push notification to client computing device 114 to alert the user that a report is available.

In an example embodiment, a user owns a high-end custom screw manufacturing company. The company specializes in state-of-the-art, high-end screws made with materials specified for industries that have precise quality and reliability requirements. Based on the requirements, tracking any imperfections to the high-end materials as well as understanding the imperfections, trending, and usage of that data is critical. Microstamping each screw with a unique ID is difficult and cost prohibitive. The company uses manufacturing tracking program 106 to track, compare, and list all screw variances with unique IDs for all the high-end screws created within the factory. Manufacturing tracking program 106 can retrieve a digital twin template, pass each screw by a high definition camera that captures imperfections, map those unique imperfections to a copy of the digital twin template, and use the mapping as a unique ID.

Figure 3:
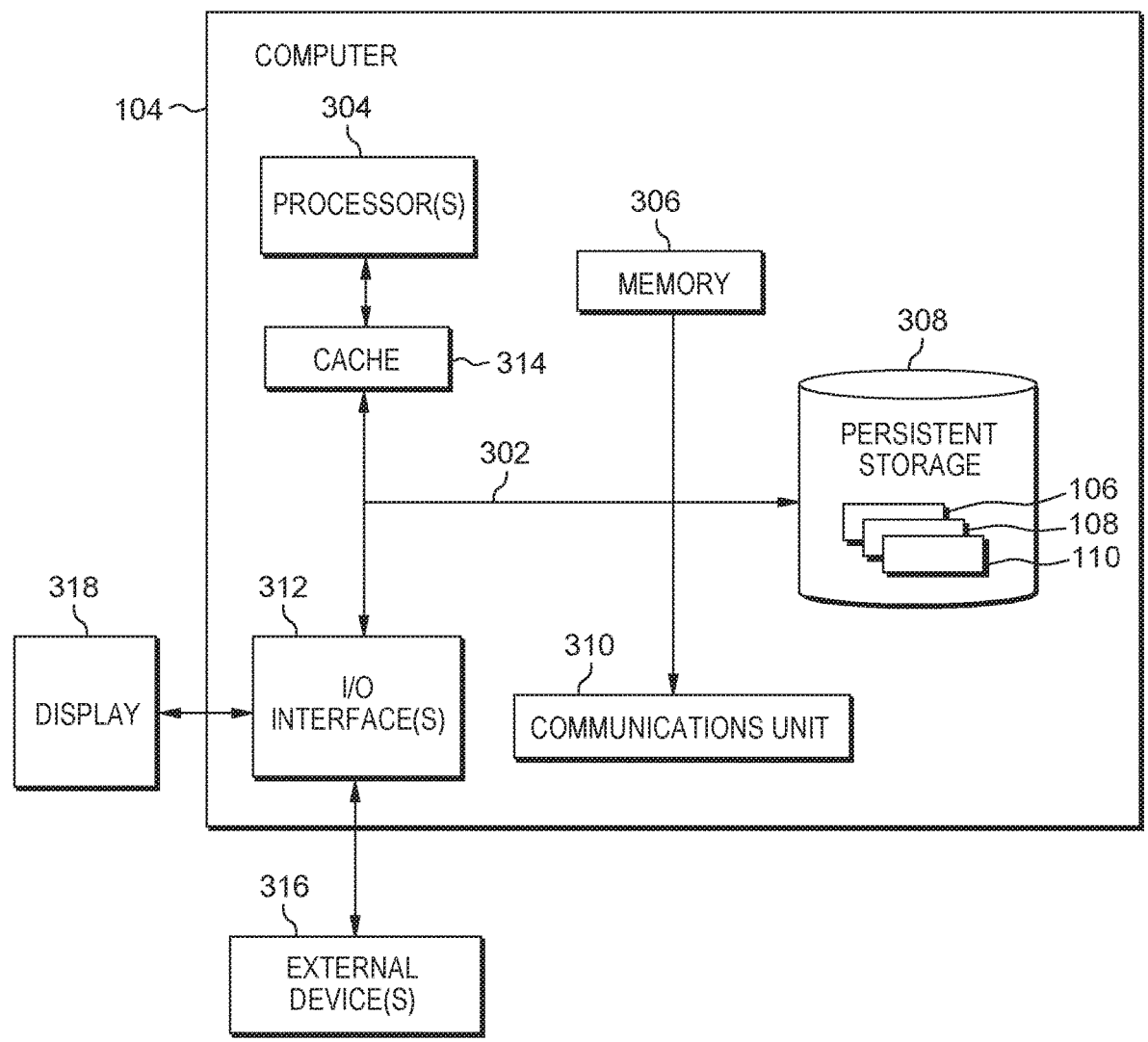
FIG. 3 depicts a block diagram of components of the server computer executing the manufacturing tracking program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., manufacturing tracking program 106, digital twin database 108, and unique ID database 110, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of camera(s) 112 and client computing device 114. In these examples, communications unit 310 includes one or more network interface cards. Communications unit 310 may provide communications through the use of either or both physical and wireless communications links. Manufacturing tracking program 106, digital twin database 108, unique ID database 110, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., manufacturing tracking program 106, digital twin database 108, and unique ID database 110 on server computer 104, can be stored on such portable computer readable storage media and can be loaded onto persistent storage 308 via I/O interface(s) 312. I/O interface(s) 312 also connect to display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more computer processors, one or more images of a product;
    retrieving, by one or more computer processors, a template of a digital twin corresponding to the product;
    detecting, by one or more computer processors, an imperfection in the one or more images of the product;
    mapping, by one or more computer processors, data associated with the imperfection to the template of the digital twin;
    saving, by one or more computer processors, a new version of the template of the digital twin, wherein the new version represents the product that exhibits the imperfection and includes the data associated with the imperfection;
    assigning, by one or more computer processors, a unique identifier to the new version of the template of the digital twin; and
    storing, by one or more computer processors, the data associated with the imperfection in association with the unique identifier.

2. The computer-implemented method of claim 1, further comprising:
    retrieving, by one or more computer processors, metadata associated with the product; and
    storing, by one or more computer processors, the metadata in association with the unique identifier.

3. The computer-implemented method of claim 2, wherein the metadata associated with the product includes at least one of: a location of manufacture of the product, a date of manufacture of the product, a time of manufacture of the product, a raw material used to manufacture the product, a lot number of the raw material, a date the raw material was received, a certificate of compliance of the raw material, receiving inspection data of the raw material, a temperature at which the raw material was forged, a lot number of the product, a lot size of the product, an identification of an operator that processed a lot of the product, a routing of a manufacturing process of the product, a timestamp of a manufacturing process of the product, and traceability data associated with materials used to manufacture the product.

4. The computer-implemented method of claim 2, further comprising:
    based on the data associated with the imperfection and the metadata associated with the product, determining, by one or more computer processors, one or more quality trends;
    based on the one or more quality trends, generating, by one or more computer processors, a report; and
    transmitting, by one or more computer processors, the report to a user.

5. The computer-implemented method of claim 1, wherein the one or more images of the product are taken at multiple angles.

6. The computer-implemented method of claim 1, wherein mapping data associated with the imperfection to the template of the digital twin further comprises:
    mapping, by one or more computer processors, data associated with the imperfection via one or more coordinates that describe a location of the imperfection on the product.

7. The computer-implemented method of claim 1, wherein the template of the digital twin includes digital content associated with a physical asset.

8. A computer program product comprising:
    one or more computer readable storage media and program instructions collectively stored on the one or more computer readable storage media, the stored program instructions comprising:
    program instructions to receive one or more images of a product;
    program instructions to retrieve a template of a digital twin corresponding to the product;
    program instructions to detect an imperfection in the one or more images of the product;
    program instructions to map data associated with the imperfection to the template of the digital twin;
    program instructions to save a new version of the template of the digital twin, wherein the new version represents the product that exhibits the imperfection and includes the data associated with the imperfection;

program instructions to assign a unique identifier to the new version of the template of the digital twin; and program instructions to store the data associated with the imperfection in association with the unique identifier.

9. The computer program product of claim 8, the stored program instructions further comprising:

program instructions to retrieve metadata associated with the product; and program instructions to store the metadata in association with the unique identifier.

10. The computer program product of claim 9, wherein the metadata associated with the product includes at least one of: a location of manufacture of the product, a date of manufacture of the product, a time of manufacture of the product, a raw material used to manufacture the product, a lot number of the raw material, a date the raw material was received, a certificate of compliance of the raw material, receiving inspection data of the raw material, a temperature at which the raw material was forged, a lot number of the product, a lot size of the product, an identification of an operator that processed a lot of the product, a routing of a manufacturing process of the product, a timestamp of a manufacturing process of the product, and traceability data associated with materials used to manufacture the product.

11. The computer program product of claim 9, the stored program instructions further comprising:

based on the data associated with the imperfection and the metadata associated with the product, program instructions to determine one or more quality trends;

based on the one or more quality trends, program instructions to generate a report; and program instructions to transmit the report to a user.

12. The computer program product of claim 8, wherein the one or more images of the product are taken at multiple angles.

13. The computer program product of claim 8, wherein the program instructions to map data associated with the imperfection to the template of the digital twin comprise:

program instructions to map data associated with the imperfection via one or more coordinates that describe a location of the imperfection on the product.

14. The computer program product of claim 8, wherein the template of the digital twin includes digital content associated with a physical asset.

15. A computer system comprising:

one or more computer processors;

one or more computer readable storage media;

program instructions collectively stored on the one or more computer readable storage media for execution by at least one of the one or more computer processors, the stored program instructions comprising:

program instructions to receive one or more images of a product;

program instructions to retrieve a template of a digital twin corresponding to the product;

program instructions to detect an imperfection in the one or more images of the product;

program instructions to map data associated with the imperfection to the template of the digital twin;

program instructions to save a new version of the template of the digital twin, wherein the new version represents the product that exhibits the imperfection and includes the data associated with the imperfection;

program instructions to assign a unique identifier to the new version of the template of the digital twin; and program instructions to store the data associated with the imperfection in association with the unique identifier.

16. The computer system of claim 15, the stored program instructions further comprising:

program instructions to retrieve metadata associated with the product; and program instructions to store the metadata in association with the unique identifier.

17. The computer system of claim 16, wherein the metadata associated with the product includes at least one of: a location of manufacture of the product, a date of manufacture of the product, a time of manufacture of the product, a raw material used to manufacture the product, a lot number of the raw material, a date the raw material was received, a certificate of compliance of the raw material, receiving inspection data of the raw material, a temperature at which the raw material was forged, a lot number of the product, a lot size of the product, an identification of an operator that processed a lot of the product, a routing of a manufacturing process of the product, a timestamp of a manufacturing process of the product, and traceability data associated with materials used to manufacture the product.

18. The computer system of claim 16, the stored program instructions further comprising:

based on the data associated with the imperfection and the metadata associated with the product, program instructions to determine one or more quality trends;

based on the one or more quality trends, program instructions to generate a report; and program instructions to transmit the report to a user.

19. The computer system of claim 15, wherein the one or more images of the product are taken at multiple angles.

20. The computer system of claim 15, wherein the program instructions to map data associated with the imperfection to the template of the digital twin comprise:

program instructions to map data associated with the imperfection via one or more coordinates that describe a location of the imperfection on the product.

\* \* \* \* \*